(12) United States Patent
Makwana et al.

(10) Patent No.: US 11,783,206 B1
(45) Date of Patent: Oct. 10, 2023

(54) METHOD AND SYSTEM FOR MAKING BINARY PREDICTIONS FOR A SUBJECT USING HISTORICAL DATA OBTAINED FROM MULTIPLE SUBJECTS

(71) Applicants: Anoop Makwana, Bangalore (IN);
Manish Shah, Bangalore (IN);
Goutham Kallepalli, Bangalore (IN);
Aminish Sharma, Bangalore (IN);
Shashi Roshan, Bangalore (IN);
Venkata Giri Sirigiri, Bangalore (IN)

(72) Inventors: Anoop Makwana, Bangalore (IN);
Manish Shah, Bangalore (IN);
Goutham Kallepalli, Bangalore (IN);
Aminish Sharma, Bangalore (IN);
Shashi Roshan, Bangalore (IN);
Venkata Giri Sirigiri, Bangalore (IN)

(73) Assignee: Intuit Inc., Mountain View, CA (US)

( * ) Notice: Subject to any disclaimer, the term of this patent is extended or adjusted under 35 U.S.C. 154(b) by 1459 days.

(21) Appl. No.: 16/102,004

(22) Filed: Aug. 13, 2018

(51) Int. Cl.
*G06N 5/04* (2023.01)
*G06N 20/00* (2019.01)
*G06Q 10/04* (2023.01)

(52) U.S. Cl.
CPC ............ *G06N 5/04* (2013.01); *G06N 20/00* (2019.01); *G06Q 10/04* (2013.01)

(58) Field of Classification Search
None
See application file for complete search history.

(56) References Cited

PUBLICATIONS

Chen, et al., XGBoost: A Scalable Tree Boosting System, arXiv, 2016, pp. 1-13 (Year: 2016).*
Yu, Towards Realistic Facial Expression Recognition, Doctoral Thesis, The University of Sydney, 2013, pp. 1-164 (Year: 2013).*
Edward I. Altman, "Financial Ratios, Discriminant Anaylysis and the Prediction of Corporate Bankruptcy"; The Journal of Finance, vol. 23, No. 4; pp. 589-609; Sep. 1968 (22 pages).

* cited by examiner

*Primary Examiner* — Wilbert L Starks
(74) *Attorney, Agent, or Firm* — Ferguson Braswell Fraser Kubasta PC

(57) ABSTRACT

A method for making binary predictions for a subject involves obtaining historical data for multiple subjects, the historical data including, for each subject, a feature set and a binary outcome, generating training data from the historical data, and training a predictive model using the training data to predict the outcomes based on the feature sets. The method further includes obtaining historical data including a feature set for a subject under consideration, and predicting a binary outcome for the subject under consideration, based on the feature set associated with the subject under consideration.

17 Claims, 11 Drawing Sheets

Features
512

| |
|---|
| EBITDA |
| EBITDA Margin |
| PAT Margin |
| Return On Equity |
| Net Profit Margin |
| Return On Capital Employed |
| Debt To Equity Ratio |
| Debt To Asset Ratio |
| Asset Turnover |
| Financial Leverage |
| Fixed Assets Turnover |
| Working Capital Turnover |
| Total Assets Turnover |
| Accounts Receivable Turnover |
| Payables Turnover |
| Current Ratio |
| Quick Ratio |
| Cash Ratio |
| Debt To Capital Ratio |
| Gross Profit Margin |
| Operating Profit Margin |
| Equity Ratio |
| Operating Profit Ratio |
| Net Profit To Net Worth Ratio |
| Debtors Turnover Ratio |
| Cogs To Fixed Assets Ratio |
| Overall Profitability Ratio |
| Capitalization Ratio |
| Interest Coverage Ratio |
| Long Term Debt To Net Working Capital |
| Cash Turnover |
| Current To Non Current Liabilities Ratio |
| Current To Total Liabilities Ratio |
| Net Working Capital To Sales Ratio |
| Long Term Debt To Assets Ratio |
| Equity Multiplier |
| Basic Earning Power Ratio |
| Net Working Capital Ratio |
| Return On Assets |
| Working Capital |
| Working Capital/Total Assets |
| Retained Earnings/Total Assets |
| EBIT/Total Assets |
| Total Equity/Total Liabilities |
| Income/Total Assets |

Features
(for one, two, three and five years)
514

| |
|---|
| Bank CAGR (Compound Annual Growth Rate) |
| AR CAGR |
| Other Current Assets CAGR |
| Fixed Assets CAGR |
| Other Assets CAGR |
| AP CAGR |
| Credit Card CAGR |
| Other Current Liabilities CAGR |
| Long Term Liabilities CAGR |
| Equity CAGR |
| Income CAGR |
| COGS CAGR |
| Expense CAGR |
| Other Income CAGR |
| Other Expense CAGR |

Outcomes
516

| |
|---|
| Active |
| Out Of Business |

*FIG. 5D*

METHOD AND SYSTEM FOR MAKING BINARY PREDICTIONS FOR A SUBJECT USING HISTORICAL DATA OBTAINED FROM MULTIPLE SUBJECTS

BACKGROUND

A real-world subject, e.g., a process, a business, a human, a device, etc. may encounter a state with two possible outcomes. The two outcomes may be, for example, yes/no, good/bad, pass/fail, fast/slow outcomes, left/right, option A/option B, etc. Prediction of the correct outcome may be beneficial to properly accommodate the outcome. For example, correctly predicting a network path with the highest bandwidth would allow a network administrator to properly route data; correctly predicting the bankruptcy of a business may enable a lender to avoid losses, etc.

SUMMARY

In general, in one aspect, one or more embodiments relate to a method for making binary predictions for a subject, the method comprising: obtaining historical data for a plurality of subjects, the historical data comprising, for each subject, a feature set and a binary outcome; generating training data from the historical data; training a predictive model using the training data to predict the outcomes based on the feature sets; obtaining historical data comprising a feature set for a subject under consideration; and predicting a binary outcome for the subject under consideration, based on the feature set associated with the subject under consideration.

In general, in one aspect, one or more embodiments relate to a system for making binary predictions for a subject, the system comprising: a subject database comprising historical data for subjects; a computer processor; a predictive model training engine executing on the computer processor configured to: obtain the historical data for a plurality of the subjects, the historical data comprising, for each subject, a feature set and a binary outcome; generate training data from the obtained historical data; and train a predictive model using the training data to predict the outcomes based on the feature sets; a prediction engine executing on the computer processor configured to: obtain the historical data comprising a feature set for a subject under consideration; and predict a binary outcome for the subject under consideration, based on the feature set associated with the subject under consideration.

In general, in one aspect, one or more embodiments relate to a non-transitory computer readable medium including computer readable program code for causing a computer system to obtain historical data for a plurality of subjects, the historical data comprising, for each subject, a feature set and a binary outcome; generate training data from the historical data; train a predictive model using the training data to predict the outcomes based on the feature sets; obtain historical data comprising a feature set for a subject under consideration; and predict a binary outcome for the subject under consideration, based on the feature set associated with the subject under consideration.

Other aspects of the disclosure will be apparent from the following description and the appended claims.

BRIEF DESCRIPTION OF DRAWINGS

FIGS. 5D, 5E and 5F show a second example for predicting solvency of a business, in accordance with one or more embodiments of the disclosure.

DETAILED DESCRIPTION

Figure 1:
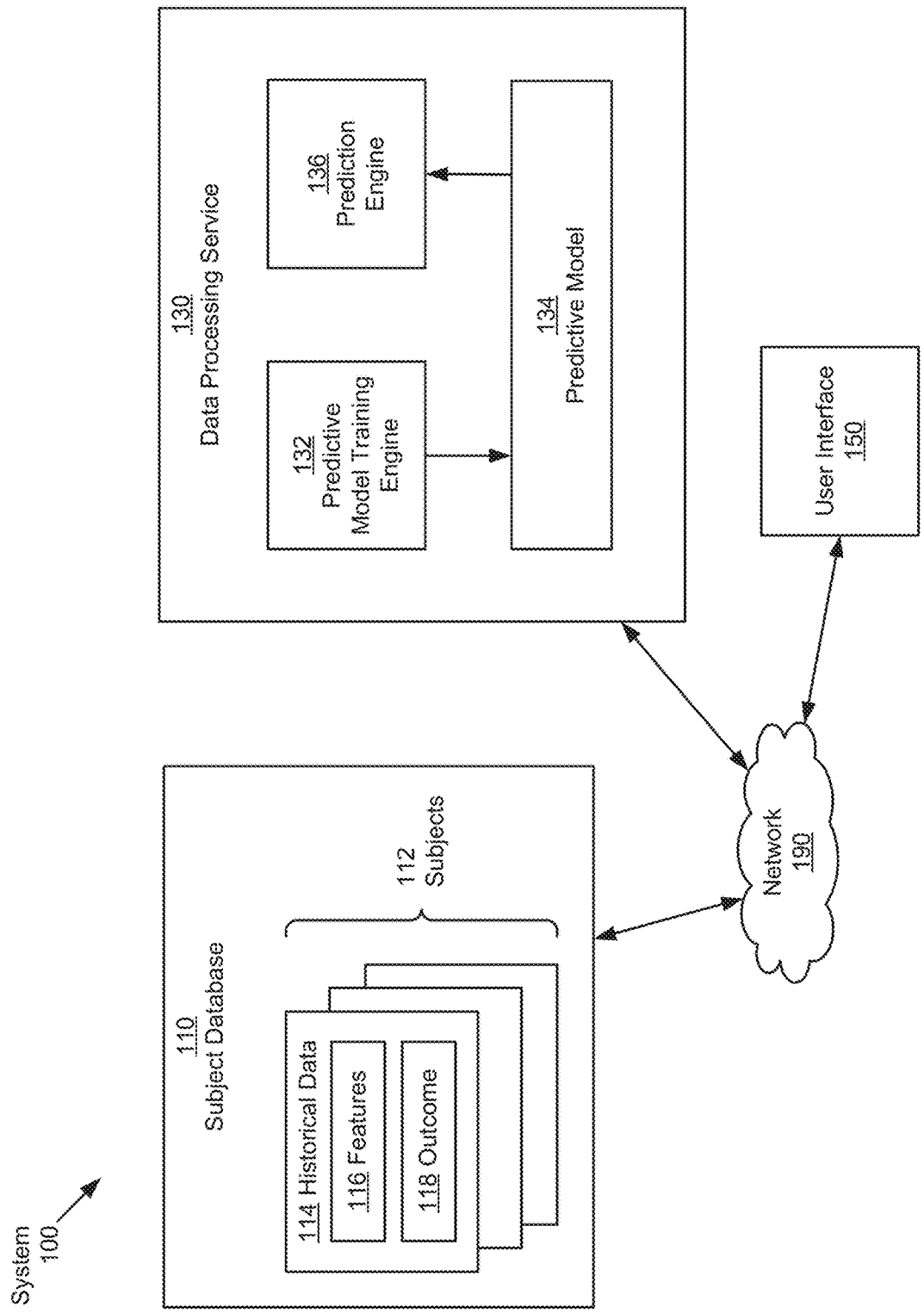
FIG. 1 shows a system for making binary predictions for a subject using historical data obtained from multiple subjects, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

A real-world subject, e.g., a process, a business, a human, a device, etc. may encounter a state with two possible outcomes. The two outcomes may be, yes/no, good/bad, pass/fail, fast/slow outcomes, left/right, option A/option B, 1/0, etc. Prediction of the correct outcome may be beneficial to properly accommodate the outcome. For example, correctly predicting the network path with the highest bandwidth would allow a network administrator to properly route data; correctly predicting the bankruptcy of a business may enable a lender to avoid losses, etc. A simple guess of a binary outcome would have a statistical likeliness of 50% for correctly predicting the outcome. The accuracy of a prediction may increase when prior knowledge is considered. In one or more embodiments of the disclosure, historical data obtained from other subjects may be used to facilitate the accurate prediction of the outcome associated with the subject under consideration.

Consider, for example, a scenario in which one attempts to predict whether a business will succeed or fail in the foreseeable future. With no prior knowledge, one may guess success or failure with a statistical accuracy of 50%. To more accurately predict success or failure, in one or more embodiments of the disclosure, historical data about similar businesses are used to guide the prediction. The historical data may include accounting records and documentation of success/failure collected for many businesses and extracted (e.g., through APIs) from financial management applications including, for example, accounting software, payroll software, tax preparation software, etc. Because success/failure of a business, to at least some extent, depends on the financial situation of the business, a prediction of success or failure may be possible, using the accounting records that document the financial situation of the business. With the availability of a sufficient number of historical accounting records associated with businesses for which success of failure is known, a predictive model to be used for predicting future success or failure of a currently active business may be obtained.

In other words, the financial data of businesses, along with outcomes (i.e., success or failure of these businesses) are used to train a predictive model using a supervised machine learning paradigm. The obtained predictive model is validated to confirm its dependability based on the predictive model's ability to successfully predict known outcomes. Subsequently, the predictive model may be applied to financial data associated with a business for which the outcome is not yet known to make a prediction of whether the business will succeed or fail.

Consider, another scenario in which a series of engines have been tested under load while the engine temperature was measured. A few engines reached significantly elevated temperature levels and were found to fail prematurely. All other engines did not fail prematurely. Based on these data, a prediction may be made for a specific engine under consideration. This engine under consideration is currently being tested, and an elevated temperature is measured. Accordingly, one may predict that this engine is also likely to fail early.

In a generalization of the above examples, methods and systems may predict an outcome associated with a subject under consideration, based on known historical data and associated known outcomes, in accordance with one or more embodiments of the disclosure. A detailed description of the use of known historical data and associated known outcomes to predict an outcome for a subject under consideration is subsequently provided.

Turning to FIG. 1, a system for making binary predictions for a subject using historical data obtained from multiple subjects, in accordance with one or more embodiments of the disclosure, is shown. The system (100) may include a subject database (110), a data processing service (130), a user interface (150), and a network (190). Each of these components is described below.

The subject database (110), in accordance with one or more embodiments of the present disclosure, stores data that are related to subjects (112). A subject may be anything for which a binary prediction may be made. A subject may be a device, a system, a person, a process, etc. For example, if the system (100) is used to decide between network paths to be used for data transmission, the subject may be a network; if the system (100) is used to predict whether a business is likely to fail, the subject may be a business, etc. Various use cases are provided below to further illustrate subjects and binary decisions.

The format and structure of the subject database may differ, depending on the subjects stored in the database. In the previously mentioned network path scenario, the subject database may be a network performance log. In contrast, in a business analysis scenario, the subject database may include accounting records, and/or other publicly available or not publicly available business information. In one or more embodiments of the disclosure, the subject database includes historical data (114) for many subjects, e.g., hundreds, thousands, hundreds of thousands, or even millions of subjects (112). For each subject, the subject database (110) stores historical data (114).

The historical data (114) associated with a subject (112) may include features (116). In one or more embodiments of the disclosure, the features (116), associated with a particular subject (112) establish a history of a subject. One feature set may exist per subject, and the feature set may include any number of features. Any data point that was collected for a subject over time may be considered a feature. These data points may be provided in any format suitable to provide information related to the underlying subject. For example, a data point may be provided as a floating point, integer or string variable. A more detailed description is provided below, based on specific use cases.

The historical data (114) associated with a subject (112) may further include an outcome (118). The outcome (118) may be an event that was observed. In one or more embodiments, the outcome is a binary outcome that may be described using terms such as either/or, yes/no, true/false, pass/fail, good/bad, fast/slow, left/right, option A/option B etc. A more detailed description is provided below, based on specific use cases.

To further illustrate historical data (114), features (116) and outcomes (118), consider, for example, a scenario in which the subject database (110) contains data to be used for a prediction of the likeliness of a business to fail. In this scenario, the subjects (112) are businesses. Assume that the business for which the prediction is to be made (i.e., the subject under consideration) is a florist. Other businesses stored in the subject database (110) may include other florists, businesses that are in more or less related industries, e.g., nurseries and home improvement stores, but also businesses that are not necessarily in related industries, e.g., IT service providers, financial service provides, etc. For each of these businesses, historical data (114) are recorded. The historical data, in case of the florist, may include any available business data. For example, the features (116) may include data points that document the inventory of particular flowers (roses, lilies, orchids, . . . ). Further, the historical data may include sales volumes, account balances, liabilities, etc. Similar historical data may be stored in the subject database (110) for the other businesses (e.g., the other florists, nurseries, home improvement stores, and other less related businesses). For at least some of the documented businesses, an outcome (118) is available. In the discussed scenario, the outcome is binary, indicating that a business is either still operating or ceased to operate.

Alternatively, consider a scenario in which the subject database (110) contains data to be used for a prediction of the likeliness of a freshly manufactured batch of drugs meeting a quality standard. In this scenario, the subjects (112) are drugs and other products manufactured by the drug manufacturer, and the historical data (114) includes features (116) that are documented manufacturing parameters such as temperatures, concentrations of ingredients, deviations from the default manufacturing process, etc. that are documented in the subject database (112). For at least some of the documented drugs and other products, an outcome (118) is available. In the discussed scenario, the outcome is binary, indicating that a drug or other product either meets or fails to meet the specified quality standard.

In one or more embodiments of the disclosure, at least some of the features of a subject in the historical data had an impact on the outcome associated with that subject. Some features may have a stronger impact on the outcome than others. Further, some features may not have any impact on the outcome. To what degree a feature affects an outcome is initially not necessarily known.

Continuing with the discussion of the subject database (110), the subject database (110) may be implemented using any format suitable for the storage of historical data such as numbers and/or alphanumeric content in the form of time series and/or events. The subject database (110) may be stored in non-volatile or volatile memory, e.g. on a hard disk drive or in RAM. The database may be central or distributed.

Figure 2:
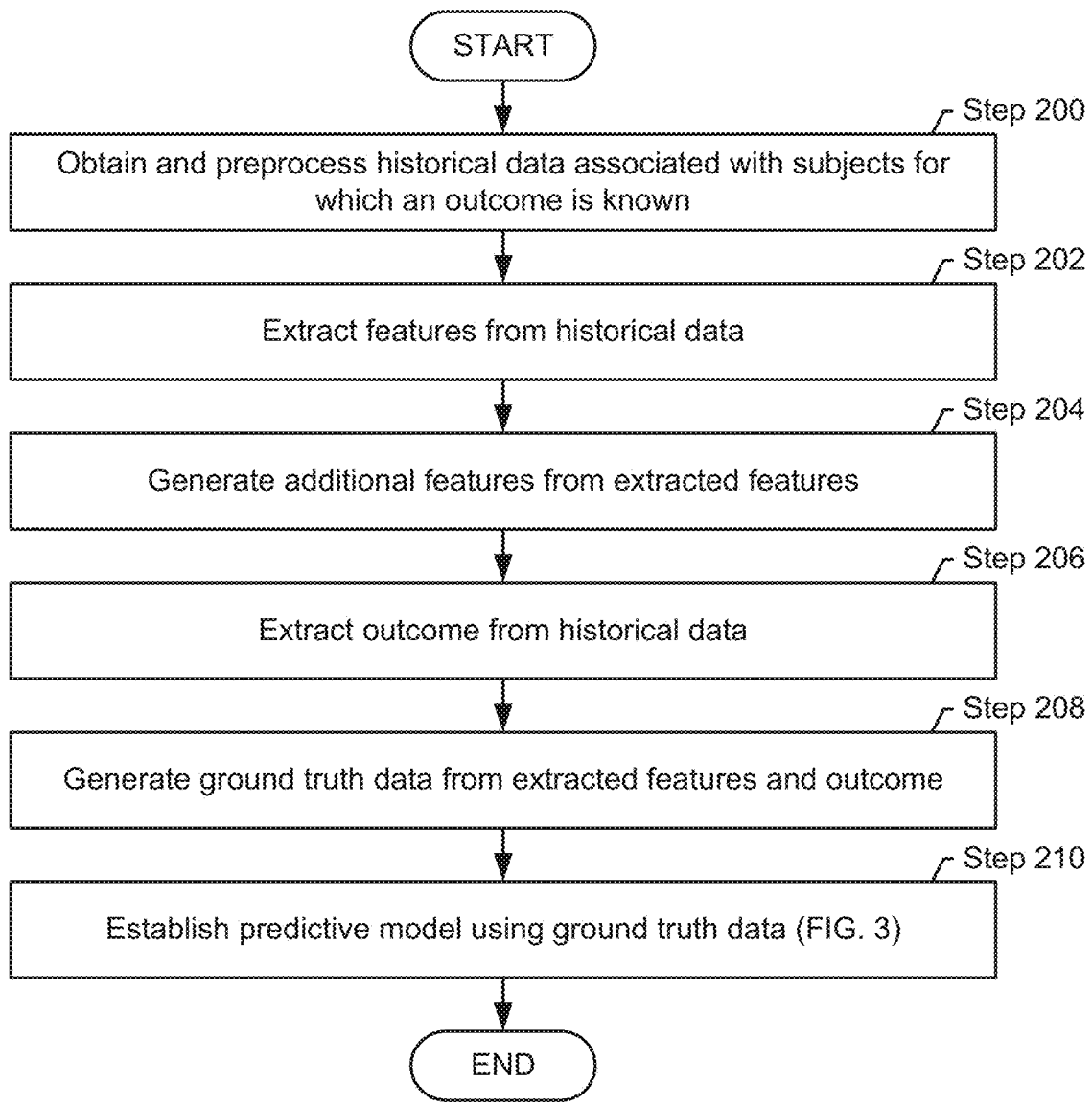
FIGS. 2 and 3 show flowcharts describing the training of a predictive model using historical data, in accordance with one or more embodiments of the disclosure.
Figure 3:
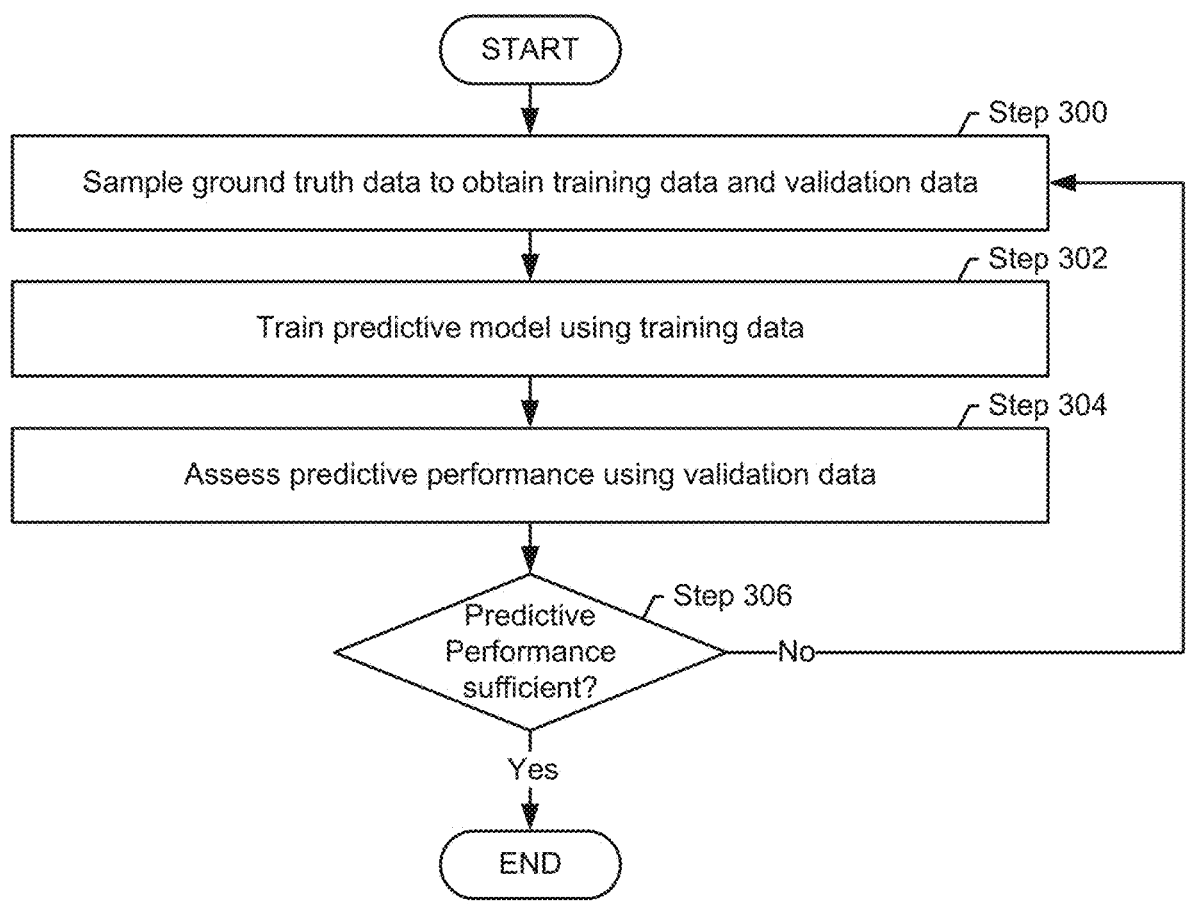
Figure 4:
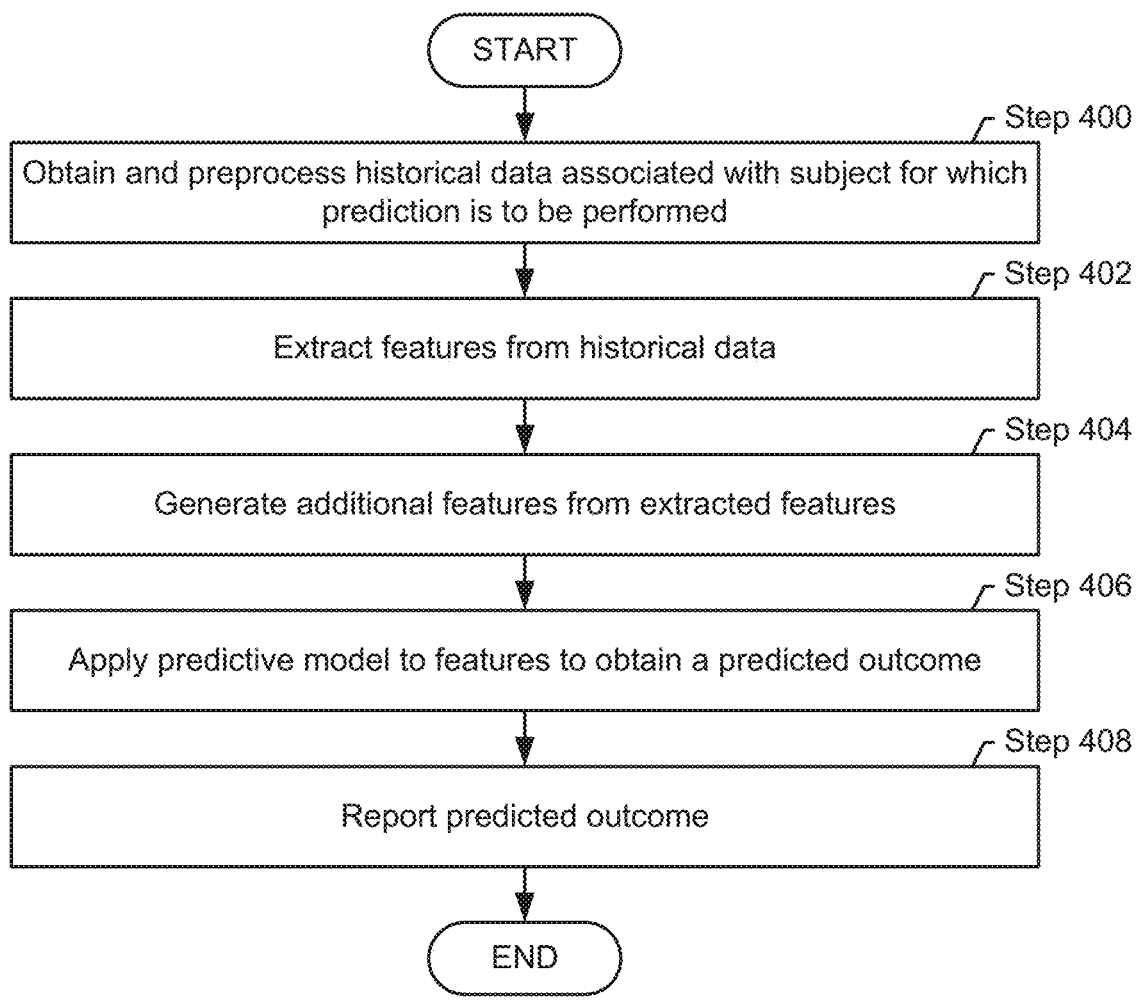
FIG. 4 shows a flowchart describing the prediction of an outcome using a predictive model, in accordance with one or more embodiments of the disclosure.

Continuing with the discussion of the system (100), the data processing service (130), in accordance with one or more embodiments of the present disclosure, includes a set of machine-readable instructions (stored on a computer-readable medium) which, when executed by the processing service (130), perform one or more of the operations described in the flowcharts of FIGS. 2, 3 and 4. The data processing service (130) may be hosted on any type of computing system, e.g., a computing system similar to the computing system shown in FIGS. 6A and 6B. The data processing service (130) may include a predictive model training engine (132), a predictive model (134), and a prediction engine (136). A predictive model (134) may be, for example, a random forest classifier or an XGBoost classifier. If a random forest classifier is used as the predictive model (134), the predictive model training engine (132) is configured to establish the trees of the random forest, e.g., by arranging features obtained from the historical data (114) into subsets that form nodes of decision trees, and with the binary outcomes forming leaves of the decision trees. If an XGBoost classifier is used as the predictive model (134), the predictive model training engine (132) is configured to iteratively learn weak classifiers and add them to form a final strong classifier. Regardless of the predictive model selected (e.g., XGBoost classifier, random forest classifier, etc.), the prediction engine (136) is used to execute the trained predictive model (134) to make predictions. Additional details regarding the predictive model (134), including the random forest classifier and the XGBoost classifier, the predictive model training engine (132) and the prediction engine (136) are provided in the following paragraphs.

The predictive model training engine (132), in accordance with one or more embodiments of the disclosure, is configured to train the predictive model (134) using a selection of historical data (114) (i.e., features (116) and outcomes (118) associated with selected subjects (112)). In the previously introduced example for predicting success or failure of a business, the predictive model training engine (132) collects the features and outcomes of the businesses stored in the subject database. The features include data points gathered from the businesses. These data points may document various parameters that are associated with the businesses, for example, sales volumes, inventories, account balances, liabilities, the number or employees, tax payments, etc. Some of these data points may have been collected over time, such that repeated measurements (e.g., annual, monthly, weekly, daily, . . . values) exist for the same data point. The outcomes for these businesses are whether these businesses are still operating or have failed. The features and outcomes are used as inputs to the predictive model training engine to enable training of the predictive model using a supervised learning approach. The exact configuration and operation of the predictive model training engine may depend on the type of predictive model that is used. The operations performed by the predictive model training engine are discussed in FIGS. 2 and 3.

The predictive model (134), in accordance with one or more embodiments of the disclosure, is the result of the training performed by the predictive model training engine (132). The predictive model (134) may be configured to accept features of a subject under consideration as inputs to make a prediction regarding the outcome associated with the subject under consideration. In the previously introduced example for predicting success or failure of a business, the input to the predictive model (134) may include some or all of the features gathered as historical data for the business under consideration. The predictive model (134), may predict the outcome (success or failure) for the business under consideration based on this input. As previously noted, the predictive model may be any kind of machine-learned model suitable to perform a binary classification. As alternatives to the previously introduced random forest classifier and XGBoost classifiers, decision trees, Bayesian networks, support vector machines, neural networks, logistic regressions, or any other machine learning type classifier algorithm may be used, without departing from the disclosure.

Similarly, different machine learning methods may be applied to train the predictive model. Broadly speaking, these machine learning methods may be based on optimization algorithms that operate on a suitable loss function to minimize that loss function over a function space of the predictive model, typically in an iterative manner, in a negative gradient direction. The exact implementation of the optimization algorithm may depend on the chosen predictive model, the type of features being used as inputs to the model, the number of features to be considered, etc. For example, if an XGBoost classifier is used, the classifier is trained using a gradient boost method. Alternatively, if a random forest classifier is used, the classifier may be trained using algorithms that may also be applicable to decision trees. These algorithms may consider features based on the degree of information they provide about the outcome, i.e., more relevant features are considered closer to the root of a tree, whereas less relevant features may be located in the branches toward the leaves of the tree. Many implementations of learning algorithms exist, and those skilled in the art will appreciate that any implementation that is suitable for predicting a binary outcome based on a set of features may be used.

A more detailed description of the predictive model, the application of the predictive model and the associated training procedures are provided below with reference to FIGS. 2, 3 and 4.

The prediction engine (136), in accordance with one or more embodiments of the disclosure, is configured to execute the predictive model (134) to provide a predicted outcome for the subject under consideration, based on the features associated with the subject under consideration, provided as an input to the predictive model. The prediction engine may further perform various types of preprocessing on the features. A detailed description of the operations performed by the prediction engine (132) is provided below, with reference to FIG. 4.

Continuing with the discussion of the system (100), the user interface (150), in accordance with one or more embodiments of the disclosure, enables a user to interact with the system (100). The user interface (150) may enable the user to initiate a prediction of an outcome as further described below. The user interface may be provided on a computing device similar to the computing system shown in FIG. 6. The computing device may be a non-portable or portable device.

The components of the system (100), i.e., the subject database (110), the data processing service (130) and the user interface (150) may communicate using any combination of wired and/or wireless communication protocols via a network (190). In one embodiment of the present disclosure, some or all of these components communicate via a wide area network (e.g., over the Internet), and/or a local area network (e.g., an enterprise or home network). The communication between these components may include any combination of secured (e.g., encrypted) and non-secured (e.g., un-encrypted) communication. The manner in which these components communicate may vary based on the implementation of the present disclosure.

While FIG. 1 shows a configuration of components, other configurations may be used without departing from the scope of the disclosure. For example, various components may be combined to create a single component. As another example, the functionality performed by a single component may be performed by two or more components that may be communicatively connected using a network connection. In one or more embodiments of the disclosure, the system (100) is part of another system providing other functionalities. For example, the system (100) in a configuration that predicts success or failure of a businesses may be part of a larger system, e.g., a system that may also include accounting functionalities. In this case, the subject database (110) may be an accounting database which may provide the historical data (110) based on the many accounting records stored for many businesses. Other elements of the system may be related to the processing of loans, investments, etc., to which the system (100) provides inputs regarding predicted success or failure of businesses that are being considered for loans or investments. In some configurations, the prediction of binary outcomes may be provided as a service that may be requested by users or by other services.

FIGS. 2, 3 and 4 show flowcharts in accordance with one or more embodiments of the disclosed technology. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

FIGS. 2, 3 and 4 describe various methods independent from the nature of the subjects. To further illustrate the execution of these methods, a use case that is directed to a specific type of subjects is provided in FIGS. 5A-5F.

Turning to FIG. 2, a method for training a predictive model using historical data, in accordance with one or more embodiments of the disclosure, is shown. The method described in FIG. 2 may be performed at least once to enable execution of the method described in FIG. 4 to predict a binary outcome. The method may be executed upon user request, or when sufficient historical data are available. The method may further be periodically executed, e.g., whenever additional historical data become available.

In Step 200, historical data are obtained. The historical data may be obtained by accessing a subject database similar to the subject database (110) introduced in FIG. 1. The obtained historical data, in accordance with one or more embodiments of the disclosure, are associated with subjects for which outcomes are known. For example, if the obtained historical data cover business performance, the obtained historical data include outcomes that indicate whether the observed businesses have failed or continue to exist. Each of the outcomes may be documented using a binary value. In one embodiment, historical data is stored in a tabular format with rows and columns. A separate row may be established for each subject. Multiple columns may be used to document features. For example, one column may be used to document a sales volume for the subjects, another column may be used to document expenses for the subjects, etc. The number of columns may be governed by the number of features that are documented. A feature may be stored using any variable type suitable for expressing the feature. For example, a feature may be stored using numerical representations such as floating point or integer type variables. Further, one column may be dedicated to documenting outcome for the subjects. For example, in the previously discussed business scenario, a "0" may indicate that a business continued to exist, whereas a "1" may indicate that the business has failed.

In one embodiment of the disclosure, an outcome, while not initially known, is derived. The outcome may be derived from cues that provide indications for the outcome. For example, while a failed business may not explicitly document that it has failed, indications may exist for the business having failed: The business may have stopped making regular payments, e.g. for utilities, or periodically gathered historical data contain no more data values after a certain date. In addition or alternatively, subscription cancellations for services may provide indications for a failed business, and questionnaires that may have been provided to the business in response to a cancellation request may help determine whether the cancellation is a result of the business having failed. Once an initially unknown outcome is determined, the outcome may be added to the historical data.

Further, in Step 200, the obtained historical data may undergo preprocessing. The preprocessing may include, but is not limited to detecting and discarding invalid or implausible entries. For example, if a data point in a time series is found to include a character rather than purely numerical values, this data point may be eliminated. Similarly, if a data value is likely to be an outlier, the data point may also be eliminated. The detection of outliers may be performed based on a statistical analysis, e.g., an outlier may be detected when a standard deviation is exceeded by a certain factor. Further, implausible or contradicting values may be identified and eliminated. For example, in financial scenarios negative asset values and/or contradicting values, e.g., mismatching data values in balance sheets, may be detected. Various examples for obtained historical data are provided below with reference to FIGS. 5A-5F.

In Step 202, features are extracted from the obtained historical data. Extracting the features may involve identifying a subset of features in the historical data. The subset may be formed by features that are available for all subjects for which an outcome was obtained, whereas features that are only available for some but not all subjects may be ignored. Consider the previously introduced business scenario. The historical data may include many features of many businesses. For example, for some businesses detailed sales volumes specific to particular sold items are available. Because these sales volumes are specific to only a few businesses, they may be ignored. In contrast, assume that all businesses have provided profit, cost, overall sales and other general business data. These data may be selected for extraction from the historical data. Specific features may further be selected based on instructions obtained from user input or from a configuration file. The selected features for the subjects may be represented in tabular format, as previously described. If the features in the historical data include the same feature obtained repeatedly over time (e.g. annual sales), this data may be treated as separate features that may be stored in separate columns. For example, if annual sales are available for 2005, 2006, and 2007, three columns may be introduced to document annual sales (one column for 2005 sales, one column for 2006 sales, and one column for 2007 sales). The use cases described below further illustrate the extraction of features from historical data.

In Step 204, additional features are generated from the extracted features. In one or more embodiments of the disclosure, a new feature may be generated by combining multiple of the features obtained in Step 202. The features may be combined by addition, subtraction, multiplication, division, or using any other operation. For example, a ratio may be obtained. In a financial application, for example, a profit margin may be calculated using the ratio of income and revenue. Similarly, in a technical application, an efficiency of a machine may be calculated using the ratio of output power and input power. Other additional features may include transformations, in which the transformed feature rather than the feature itself is used in the subsequent steps. A transformation may be, for example, a logarithmic or a trigonometric transformation, or broadly speaking, any kind of linear or non-linear transformation from a first into a second reference frame. Such transformations may be performed for single features, but also for multiple features, e.g. multi-dimensional coordinates.

In Step 206, the outcomes are extracted from the historical data. Outcomes for those subjects for which features were previously extracted are obtained. After completion of Step 206, combinations of outcomes (extracted in Step 206) and associated features (extracted in Step 202 and/or generated in Step 204) are available for further processing.

In Step 208, ground truth data are generated from the extracted features and the extracted outcomes. Specifically, for each subject, one feature set which may contain multiple extracted features and one extracted outcome may be included in the ground truth data. The ground truth data may be represented in matrix format, derived from the previously discussed tabular format used to represent features and outcomes. The matrix may be organized in in rows that represent in subjects and in n columns. Columns 1, 2, 3, . . . , n–1 may store the features, whereas column n may store the outcomes. The ground truth data may include historical data from multiple subjects, up to hundreds of thousands or even millions of subjects.

In Step 210, a predictive model is trained using the ground truth data. The predictive model and the training of the predictive model using supervised learning methods based on the ground truth data is subsequently described with reference to FIG. 3.

Turning to FIG. 3, the training of the predictive model is shown. The predictive model may be based on any algorithm suitable to perform a binary classification. Accordingly, the predictive model may be based on, for example, decision trees, random forests, Bayesian networks, support vector machines, neural networks, logistic regressions, etc. Similarly, different machine learning methods may be applied to train the predictive model. Broadly speaking, these machine learning methods may be based on optimization algorithms that operate on a suitable loss function to minimize that loss function over a function space of the predictive model, typically in an iterative manner, in a negative gradient direction. The exact implementation of the optimization algorithm may depend on the chosen predictive model, the type of features being used as inputs to the model, the number of features to be considered, etc.

In Step 300, the ground truth data, generated in Step 208, are sampled to obtain training data and validation data. Training data and validation data may be obtained based on a ratio. For example, 80% of the ground truth data may be used as training data and 20% of the ground truth data may be used as validation data. The selection of training data and validation data may be performed pseudo-randomly. If the ground truth data includes time series (i.e., data points of the same feature recorded over time), a cutoff may be used to eliminate older data. For example, only data points no older than two years may be considered.

In one or more embodiments of the disclosure, Step 300 further involves a systematic sampling of the ground truth data selected as training data and/or validation data:

(i) Pairwise sampling: To enable meaningful training and validation of the predictive model, for both positive and negative outcomes, subjects with similar features are selected. Consider, for example, a scenario in which the outcome is the success/failure of a business. Many businesses with success/failure outcomes may be in the ground truth data. However, the features of these different businesses may differ: The businesses may be in different industries, they may be of different sizes, the occurrence of a failure may have been at different times, etc. Pairwise sampling ensures that for a business with the outcome "success", another business with the outcome "failed", both with matching or at least similar features, are selected. To further illustrate pairwise sampling, assume that a failed business is selected to be included in the training data. The failed business is in the manufacturing industry has a total asset size of 10M, and the failure occurred in 2016. When the pairwise sampling is performed, a business with the outcome "success" with similar asset size and in manufacturing within a similar time frame is also selected to be included in the training data.

(ii) Biased sampling: Some ground truth data may be highly biased toward one outcome vs. the other outcome. For example, in the previously introduced example of successful/failed businesses, 95% of the documented businesses may be successful, whereas only 5% may have failed. Direct use of training and validation data based on this ratio may result in the training of a predictive model that produces exaggerated predictions of successful outcomes. For example, a predictive model that predicts 100% success, regardless of the features used as inputs to the predictive model would have an error rate of only 5%. Accordingly, the ground truth data to be used as training and/or validation data may be re-sampled to obtain a different ratio of outcomes. For examples, the training and/or validation data may be resampled to have a 70/30 success/failure ratio. Various methods of undersampling and oversampling may be used to obtain the desired success/failure ratio. Examples of undersampling methods that may be used include, but are not limited to: random undersampling, near-miss undersampling, condensed nearest neighbor undersampling, edited nearest neighbor undersampling, tomek link removal undersampling, and combinations thereof. Examples of oversampling methods that may be used include, but are not limited to: random oversampling, synthetic minority oversampling, ensembled sampling (e.g., easy ensemble, balance cascade), and combinations thereof.

In Step 302, the predictive model is trained using the training data. As previously noted, various predictive models and various training algorithms may be used. In one embodiment of the disclosure, the predictive model is a decision tree. Further, in one embodiment of the disclosure, the training algorithm is a gradient boosting algorithm.

The gradient boosting algorithm may turn an initially weak learner (e.g., a single tree with a relatively poor predictive accuracy) into a stronger learner (e.g., a random forest that includes multiple trees, and that has a higher predictive accuracy). The gradient boosting is performed stage-wise, with a new weak learner (i.e. another tree) added at each stage. The gradient boosting may be performed using a loss function, e.g., a logarithmic loss function, when performing classifications. Using the loss function, a weak learner (i.e. a single tree) is established in an attempt to minimize the loss function by obtaining a maximum predictive accuracy by the weak learner. When progressing through the stages of learning, trees are added one at a time, and a gradient descent procedure is used to minimize the loss when adding these trees. After calculating the loss for an existing tree or set of trees, another tree is added to reduce the loss using the gradient descent procedure, (i.e., following the gradient). The tree being added is parameterized (e.g., by selecting features to be used in the tree) to reduce the residual loss.

In one embodiment of the disclosure, the XGBoost machine learning model is used as an implementation of gradient boosting. XGBoost is a gradient boosting-based implementation of random forests. The training using the XGBoost machine learning model may be performed iteratively to optimize the chosen loss function. During this training, the parameters of the predictive model (which, in the case of the XGBoost machine learning model is formed by an ensemble of trees) may be determined. The XGBoost machine learning model supports different loss functions, and accordingly, the mean squared error loss, a logistic loss, a weighted logistic loss, etc. may be used for training. At each iterative step of the training, one tree of the tree ensemble may be optimized. Subsequently, a tree ensemble may be obtained by additive combination of these trees.

Some types of predictive models may require normalization of the features, i.e., a rescaling of the features to obtain the characteristics of a standard normal distribution. Accordingly, prior to the training of the predictive model, a normalization may be performed. Standard scaling, min-max scaling and/or robust scaling methods may be used.

In Step 304, the predictive performance of the trained predictive model may be assessed. The trained predictive model may be provided with the features of the validation data as the input to perform predictions. These predictions may be compared to the actual outcomes in the validation data to determine the accuracy of the predictive model. The ratio of correctly made predictions to all made predictions may be used to quantify the predictive performance.

In Step 306, a determination is made about whether the obtained predictive performance is sufficient. The determination may be made in various ways. For example, the prediction may be gauged based on whether a desired predictive performance has been reached. Alternatively, the determination may be made based on the improvement of the predictive performance over a previously obtained predictive model when Steps 300-304 are repeatedly performed.

If a determination made that the predictive performance is insufficient, the process may return to Step 300. In this case, the ground truth data to be used for training the predictive model may be updated. For example, different features may be selected for the training data to be used in Step 302. Additionally or alternatively, a different sampling, as described in Step 300, may be applied to the ground truth data to obtain new sets of training and validation data. The reduction of features may help reducing the complexity of the predictive model thus potentially reducing the variance of the predictive model, and/or improving the accuracy of the predictive model. Alternatively, if a determination is made that the predictive performance is sufficient, the execution of the method may terminate.

Turning to FIG. 4, the use of the predictive model to predict an outcome for a subject under consideration is shown.

In Step 400, the historical data associated with the subject of interest are obtained. The obtained historical data include features but may not include an outcome. The historical data is preprocessed analogous to the preprocessing described in Step 200 of FIG. 2.

In Step 402, the features for the subject under consideration are extracted from the historical data. The extraction may be performed analogous to the extraction described in Step 202 of FIG. 2.

In Step 404, additional features are generated from the extracted features. The generation of additional features may be performed analogous to the generation of extracted features described in Step 204 of FIG. 2.

After the execution of Steps 400-404, all features that are to be relied upon as inputs by the predictive model may be available for the subject under consideration. Should one or more features, required as inputs to the predictive model, not be available, the method of FIG. 3 may be re-executed using training data that exclude the unavailable feature(s). The newly obtained model may then be suitable to make a prediction without the unavailable feature(s).

In Step 406, the predictive model is applied to the features associated with the subject under consideration to obtain a predicted outcome. The predicted outcome, in accordance with one or more embodiments of the disclosure is binary, i.e., yes/no, 1/0, option A/option B, pass/fail, etc. Depending on the type of predictive model (for example the random forest classifier, XGBoost classifier, etc., as discussed above), a confidence interval for the prediction of the binary outcome may further be provided. The predicted outcome is subsequently reported, e.g., to a user or service having requested the prediction.

Figure 5A:
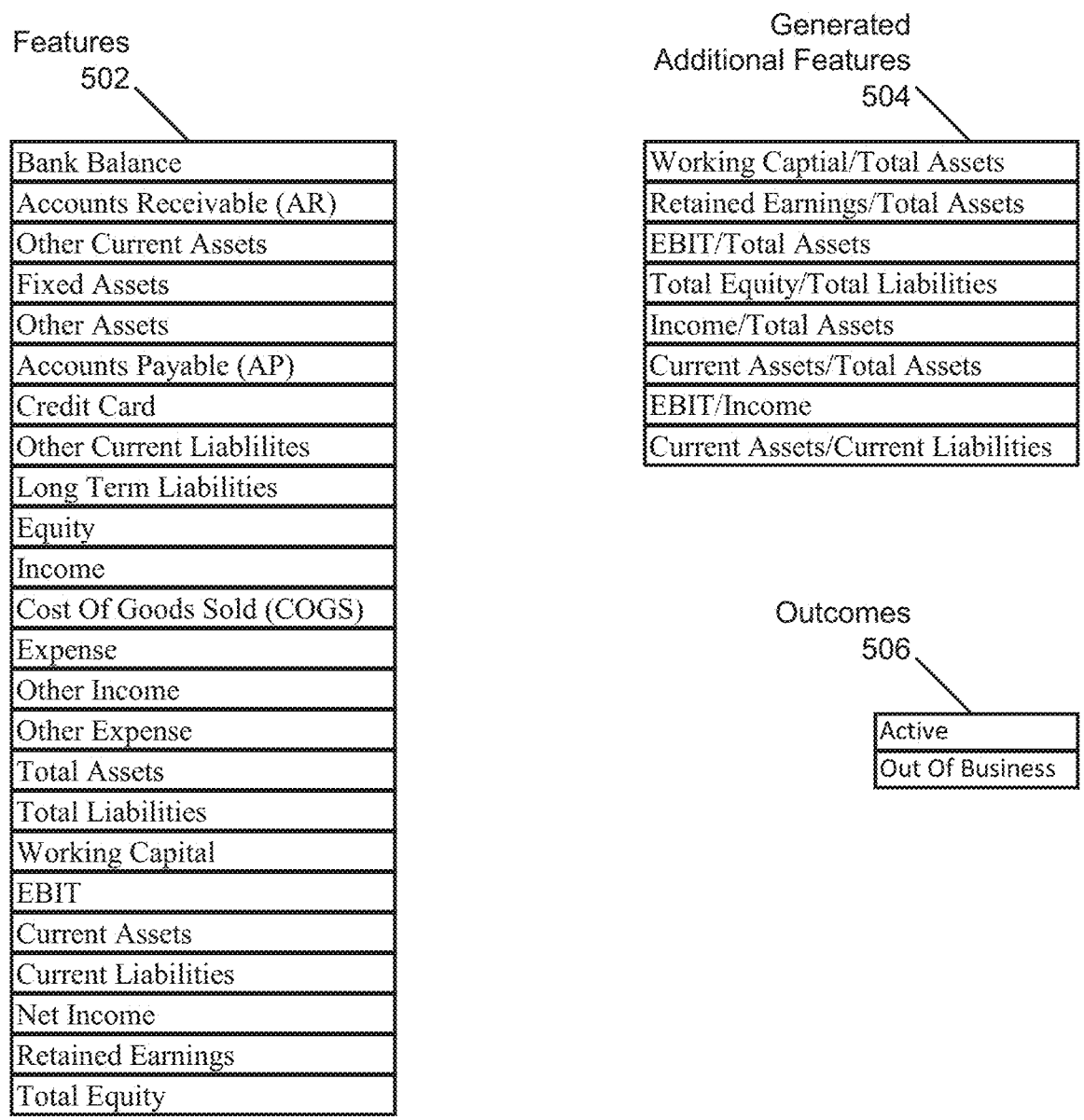
FIGS. 5A, 5B and 5C show a first example for predicting solvency of a business, in accordance with one or more embodiments of the disclosure.
Figure 5B:
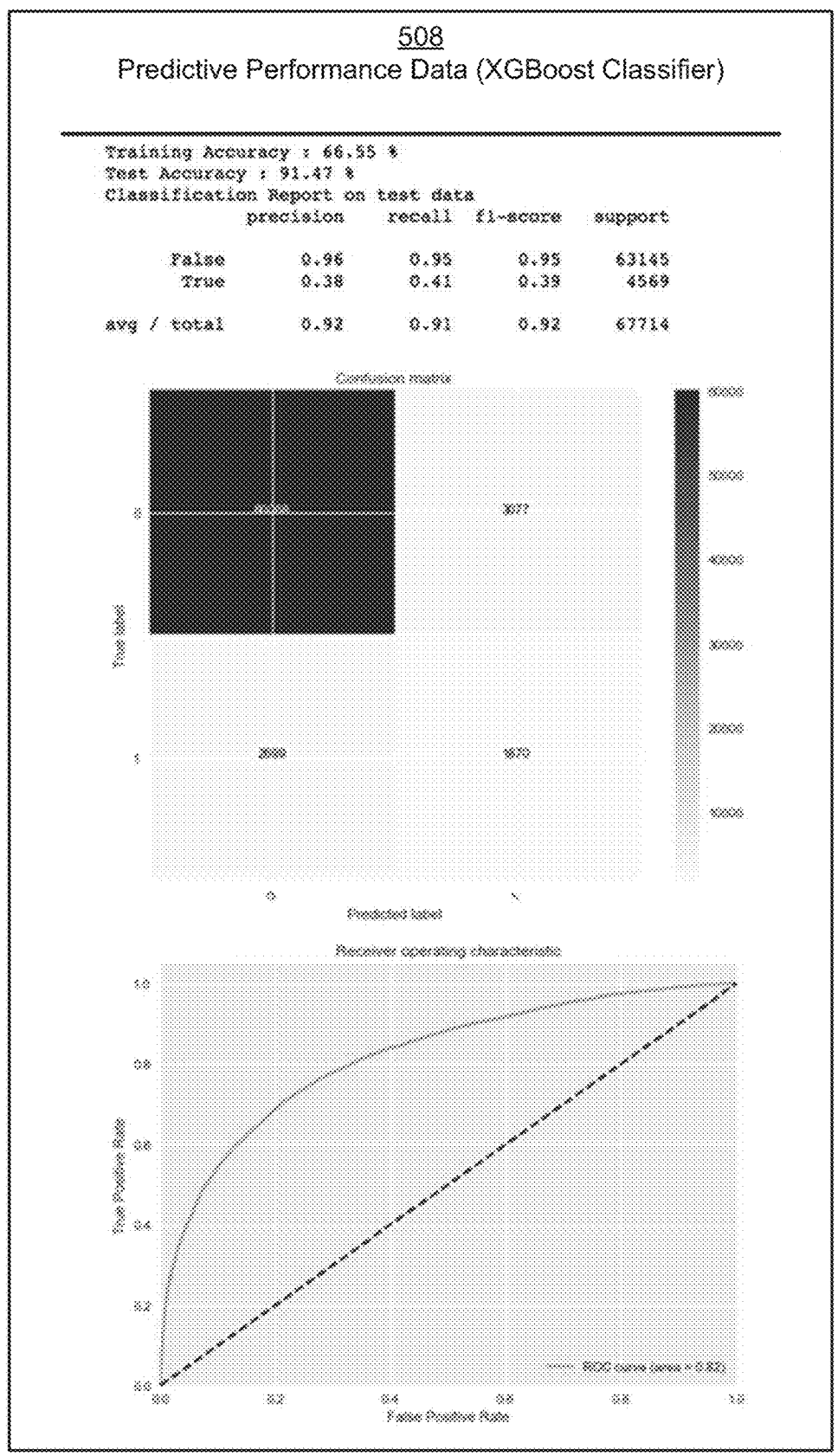
Figure 5C:
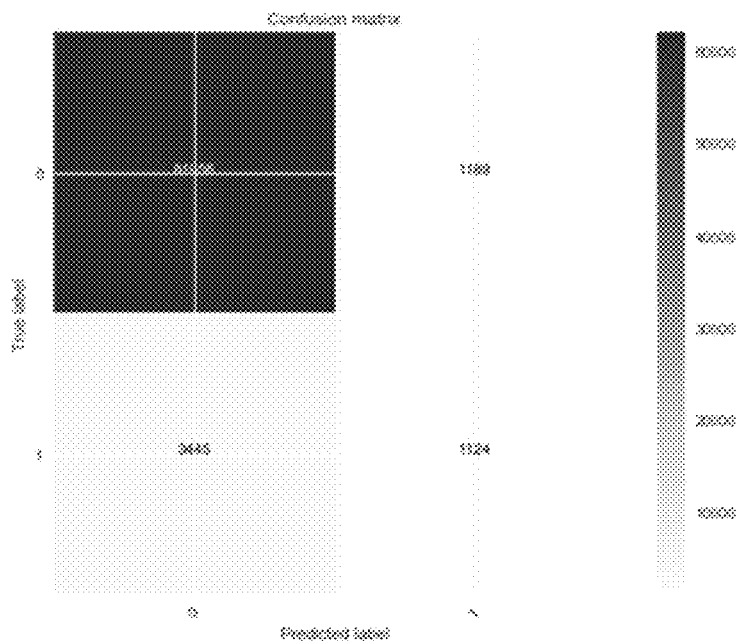
Figure 5C:
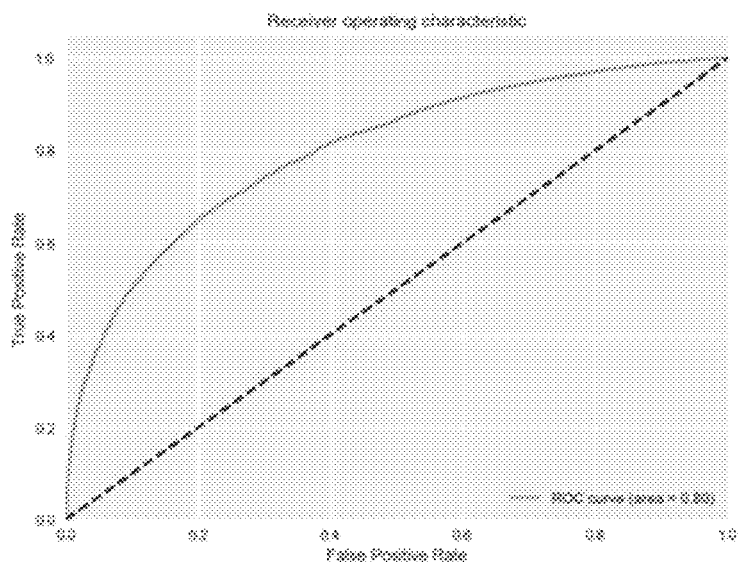

Turning to FIGS. 5A-5C, a first example for predicting solvency of a business, in accordance with one or more embodiments of the disclosure, is shown. In the example, a prediction is made about future success or failure of the business.

Turning to FIG. 5A, in the example, the features (502) include various financial attributes. These financial attributes may be extracted (e.g., through an API or other interface) from a financial management application, such as accounting software, payroll software, tax preparation software, etc. Based on these features, additional features (504) are generated. The additional features (504) include financial data that may be derived from the features (502). Consider, for example, the ratio "Working Capital/Total Assets". This ratio may be directly calculated from the features "Working Capital" and "Total Assets" that are available as features (502). In the example, assume that all these features (502, 504) are obtained for one year to predict success or failure of a business in the subsequent year. Accordingly, the predicted outcome (506) may be either "active" (e.g., the business is still operating) or "out of business". These features were obtained for 20,000 active companies and for 2,000 failed companies. The features (502), generated additional features (504) and outcomes (506) may be arranged in a tabular format suitable as an input to the predictive model (i.e. a classifier), as previously described in Step 200 of FIG. 2. An XGBoost classifier and a random forest classifier were applied to these features and the results are shown in FIG. 5B and FIG. 5C, respectively.

In FIG. 5B, predictive performance data (508) for the XGBoost classifier is shown. These results were obtained using historical data of two years and a balance cascade sampling, using the methods described in FIGS. 2, 3 and 4. The performance is summarized primarily using ratios of true positives (tp), true negatives (tn), false positives (fn), and/or false negatives (fn), such as accuracy ((tp+tn)/(tp+tn+fp+fn)), precision (tp/(tp+fp)) and recall (tp/(tp+fn)) metrics. Further, a confusion matrix (used to show that the predicted outcome and the actual outcome match in most cases, thus indicating that there is little "confusion" of failure and success of businesses by the XGBoost classifier) and a receiver operator characteristic (ROC) (visualizing true positives vs false positive as the discrimination threshold is varied) are plotted to visualize the performance.

In FIG. 5C, predictive performance data (510) for the random forest classifier is shown. These results were obtained using historical data of two years, and an edited nearest neighbor (ENN) sampling (as discussed in relation to Step 300 of FIG. 3). The performance is summarized primarily using accuracy, precision and recall metrics. Further, a confusion matrix and an ROC are plotted to visualize the performance.

Figure 5E:
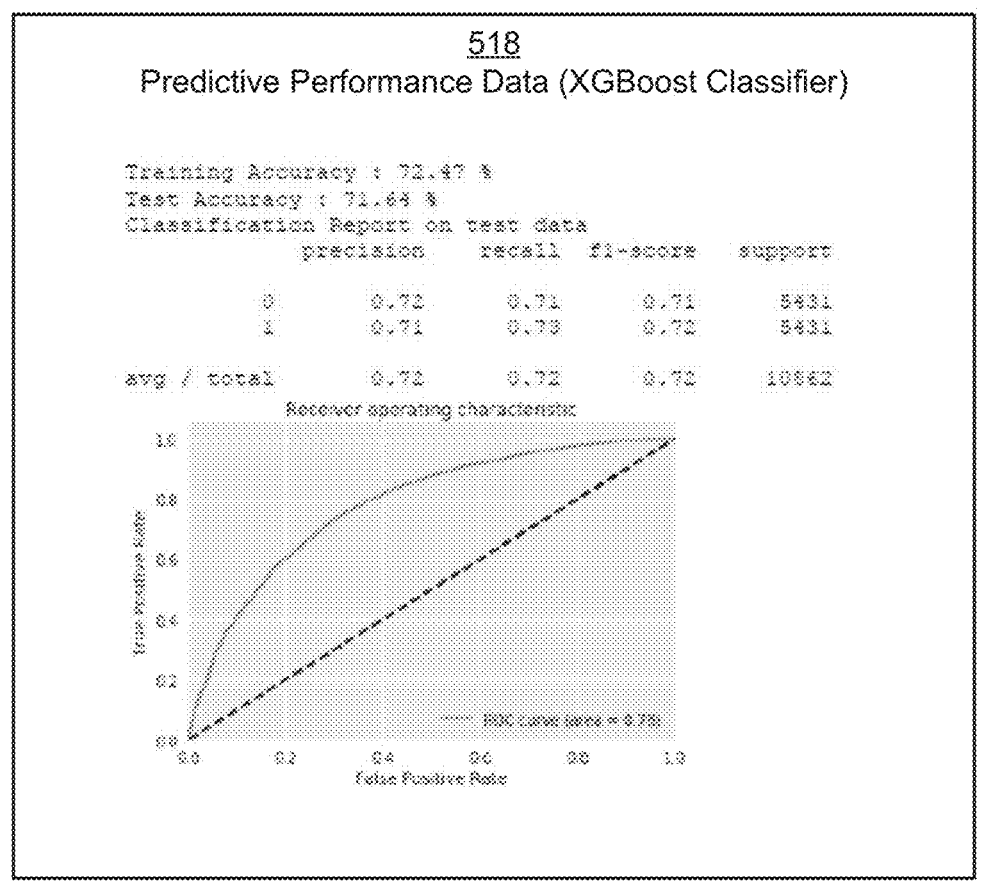
Figure 5F:
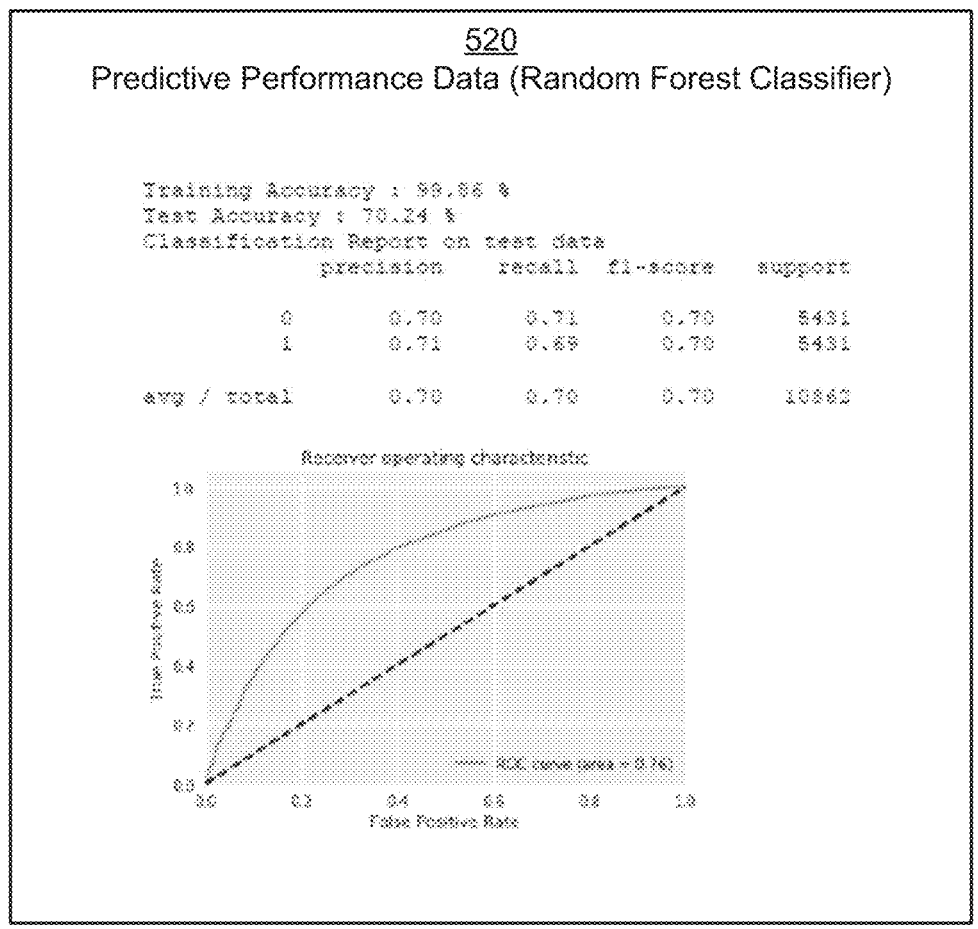

Turning to FIGS. 5D-5F, a second example for predicting solvency of a business, in accordance with one or more embodiments of the disclosure, is shown. In the example, a prediction is made about future success or failure of the business.

Turning to FIG. 5D, in the example, the features (512) include various financial attributes. These features include financial attributes that were calculated (e.g. ratios). Further, features that were repeatedly obtained for consecutive years (years one, two, three and five) (514) are also considered for the prediction of an outcome (516). Analogous to the example described with reference to FIGS. 5A-5C, these features were obtained for 20,000 active companies and for 2,000 failed companies. An XGBoost classifier and a random forest classifier were applied to these data.

In FIG. 5E, predictive performance data (518) for the XGBoost classifier is shown. The performance is summarized primarily using accuracy, precision and recall metrics. Further, an ROC is plotted to visualize the performance.

In FIG. 5F, predictive performance data (520) for the random forest classifier is shown. The performance is summarized primarily using accuracy, precision and recall metrics. Further, an ROC is plotted to visualize the performance.

The first example of FIGS. 5A-5C and the second example of FIGS. 5D-5F both predict success or failure of businesses with a high accuracy. In direct comparison, the first example provides slightly better prediction accuracy for businesses that are succeeding, whereas the second example provides slightly better prediction accuracy for businesses that are failing.

Various embodiments of the disclosure have one or more of the following advantages. Embodiments of the disclosure enable binary predictions for a subject using historical data obtained from multiple subjects. Historical data from many subjects may be considered, and based on features found in the historical data, additional features may be engineered. Thus, a rich set of features is available to increase the predictive accuracy. One or more embodiments of the disclosure are further configured to accommodate highly biased data.

Embodiments of the disclosure are applicable to a broad range of applications. Wherever a binary prediction may be made based on available historical data, embodiments of the disclosure may be applied. Embodiments of the disclosure may further synergistically use historical data that is available from other applications. Accordingly, embodiments of the disclosure provide additional insights without requiring setting up separate databases. Existing computing systems are thereby enabled to provide additional functionalities, in accordance with one or more embodiments.

Figure 6A:
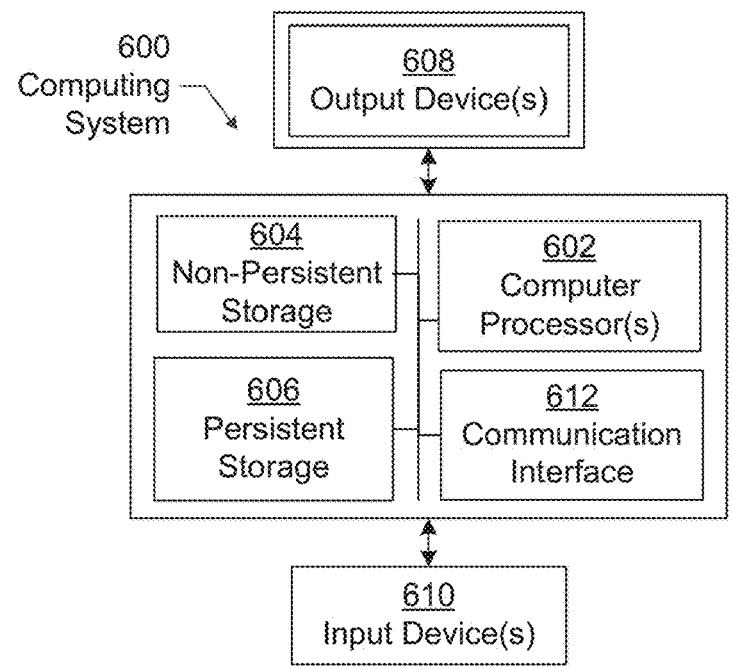
FIGS. 6A and 6B show computing systems, in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6B:
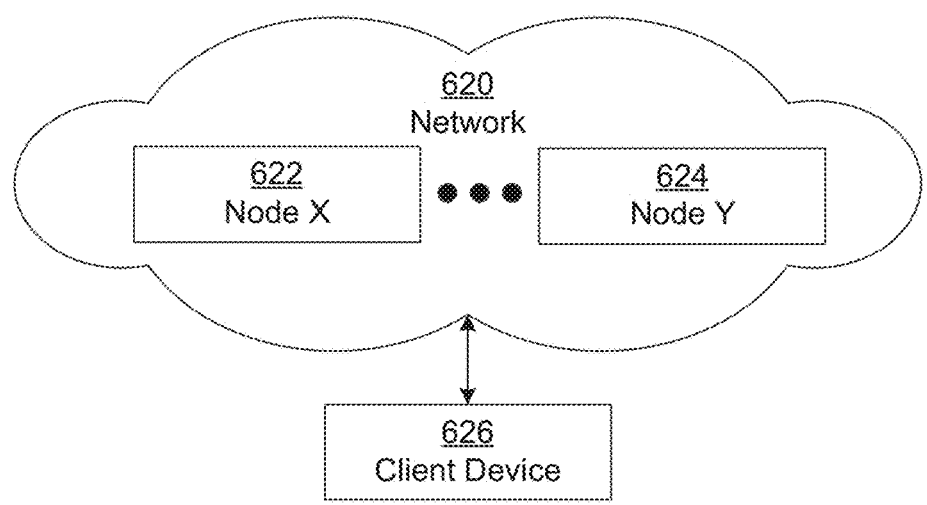

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for making binary predictions for a subject, the method comprising:
    obtaining historical data for a plurality of subjects, the historical data comprising, for each subject, a feature set and a binary outcome, wherein the binary outcome is one of a first outcome and a second outcome, wherein the plurality of subjects have an initial ratio of the first outcome to the second outcome, the initial ratio having a bias;
    sampling the historical data of the plurality of subjects according to the binary outcome to create training data having a target ratio of the first outcome to the second outcome, the target ratio correcting the bias;
    training, through a plurality of stages, a predictive model using the training data to predict the outcomes based on the feature sets, wherein training the predictive model comprises, for each of the plurality of stages:
    executing a loss function on an existing set of decision trees to determine a loss denoting a predictive accuracy of the existing set of decision trees, and
    adding a decision tree to the existing set of decision trees, wherein adding the decision tree comprises using a gradient descent procedure to parameterize the decision tree according to the loss;
    obtaining historical data comprising a feature set for a subject under consideration; and
    predicting, after training and by the predictive model, a binary outcome for the subject under consideration, based on the feature set associated with the subject under consideration.

2. The method of claim 1, wherein the subject under consideration is a business, and
    wherein the prediction of the binary outcome for the subject under consideration comprises predicting one selected from a group consisting of success and failure of the business.

3. The method of claim 2, wherein the feature sets comprise financial attributes.

4. The method of claim 1, further comprising, prior to training the predictive model, enhancing each of the feature sets with an engineered feature.

5. The method of claim 4, wherein the engineered feature is a ratio of features in the feature set.

6. The method of claim 1, wherein sampling the historical data comprises a pairwise sampling that selects, for a subject with a first feature and a positive outcome, a subject with a second feature matching the first feature and a negative outcome, to be included in the training data.

7. The method of claim 1, wherein one of the binary outcomes in the historical data is not initially known, and wherein obtaining the historical data comprises deriving the initially unknown outcome from cues in the historical data.

8. The method of claim 1, wherein the predictive model is an xgboost model.

9. A system for making binary predictions for a subject, the system comprising:
    a subject database comprising historical data for a plurality of subjects;
    a computer processor;
    a predictive model training engine executing on the computer processor configured to:
    obtain the historical data for the plurality of subjects, the historical data comprising, for each subject, a feature set and a binary outcome, wherein the binary outcome is one of a first outcome and a second outcome, wherein the plurality of subjects have an initial ratio of the first outcome to the second outcome, the initial ratio having a bias;
    sampling the historical data of the plurality of subjects according to the binary outcome to create training data having a target ratio of the first outcome to the second outcome, the target ratio correcting the bias;
    generate training data from the obtained historical data; and
    train, through a plurality of stages, a predictive model using the training data to predict the outcomes based on the feature sets, wherein training the predictive model comprises, for each of the plurality of stages:
    executing a loss function on an existing set of decision trees to determine a loss denoting a predictive accuracy of the existing set of decision trees, and adding a decision tree to the existing set of decision trees, wherein adding the decision tree comprises using a gradient descent procedure to parameterize the decision tree according to the loss;
    a prediction engine executing on the computer processor configured to:
    obtain the historical data comprising a feature set for a subject under consideration; and
    predict, after training and by the predictive model, a binary outcome for the subject under consideration, based on the feature set associated with the subject under consideration.

10. The system of claim 9, wherein the predictive model training engine is further configured to, prior to training the predictive model, enhance each of the feature sets with an engineered feature.

11. The system of claim 9, wherein sampling the historical data comprises a pairwise sampling that selects, for a subject with a first feature and a positive outcome, a subject with a second feature matching the first feature and a negative outcome, to be included in the training data.

12. The system of claim 9,
    wherein one of the binary outcomes in the historical data is not initially known, and
    wherein obtaining the historical data comprises deriving the initially unknown outcome from cues in the historical data.

13. The system of claim 9, wherein the predictive model is an xgboost model.

14. A non-transitory computer readable medium comprising computer readable program code for causing a computer system to:
    obtain historical data for a plurality of subjects, the historical data comprising, for each subject, a feature set and a binary outcome, wherein the binary outcome is one of a first outcome and a second outcome, wherein the plurality of subjects have an initial ratio of the first outcome to the second outcome, the initial ratio having a bias;

sampling the historical data of the plurality of subjects according to the binary outcome to create training data having a target ratio of the first outcome to the second outcome, the target ratio correcting the bias;

train, through a plurality of stages, a predictive model using the training data to predict the outcomes based on the feature sets, wherein training the predictive model comprises, for each of the plurality of stages:

executing a loss function on an existing set of decision trees to determine a loss denoting a predictive accuracy of the existing set of decision trees, and adding a decision tree to the existing set of decision trees, wherein adding the decision tree comprises using a gradient descent procedure to parameterize the decision tree according to the loss;

obtain historical data comprising a feature set for a subject under consideration; and predict, after training and by the predictive model, a binary outcome for the subject under consideration, based on the feature set associated with the subject under consideration.

15. The non-transitory computer readable medium of claim 14, further comprising computer readable program code for causing the computer system to, prior to training the predictive model, enhancing each of the feature sets with an engineered feature.

16. The non-transitory computer readable medium of claim 14, wherein sampling the historical data comprises a pairwise sampling that selects, for a subject with a first feature and a positive outcome, a subject with a second feature matching the first feature and a negative outcome, to be included in the training data.

17. The non-transitory computer readable medium of claim 14,
wherein one of the binary outcomes in the historical data is not initially known, and
wherein obtaining the historical data comprises deriving the initially unknown outcome from cues in the historical data.

* * * * *